US008659611B2

(12) United States Patent
Todorovich

(10) Patent No.: US 8,659,611 B2
(45) Date of Patent: Feb. 25, 2014

(54) SYSTEM AND METHOD FOR FRAME BUFFER STORAGE AND RETRIEVAL IN ALTERNATING ORIENTATIONS

(75) Inventor: Mark M. Todorovich, San Diego, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 989 days.

(21) Appl. No.: 12/726,259

(22) Filed: Mar. 17, 2010

(65) Prior Publication Data

US 2011/0227937 A1  Sep. 22, 2011

(51) Int. Cl.
*G09G 5/36* (2006.01)
*G06F 12/00* (2006.01)

(52) U.S. Cl.
USPC .......................................... 345/545; 345/564

(58) Field of Classification Search
None
See application file for complete search history.

(56) References Cited

U.S. PATENT DOCUMENTS

| 4,039,862 | A | 8/1977 | Dingwall et al. |
| 4,954,789 | A | 9/1990 | Sampsell |
| 5,034,733 | A | 7/1991 | Okazawa et al. |
| 5,784,189 | A | 7/1998 | Bozler et al. |
| 6,040,937 | A | 3/2000 | Miles |

(Continued)

FOREIGN PATENT DOCUMENTS

| WO | WO 03/007049 A1 | 1/2003 |
| WO | WO 03/073151 | 9/2003 |

(Continued)

OTHER PUBLICATIONS

IPRP dated Sep. 27, 2012 in PCT/US11/027434.

(Continued)

*Primary Examiner* — Joni Richer
*Assistant Examiner* — Michelle Chin
(74) *Attorney, Agent, or Firm* — Knobbe Martens Olson & Bear LLP

(57) ABSTRACT

The present invention provides a method and apparatus for storing image data for successive frames in a frame buffer. Specifically, the method and apparatus allow for a display-sized frame buffer to be utilized where a host system provides image data in a format different from that which the display requires to be written to it while retaining the beneficial aspects of concurrent read and write operations from and to the frame buffer. Using this method a buffer controller receives image data from a host system in a first format (e.g. row-by-row) and writes it to the frame buffer in the first format. When the buffer is completely filled with the first frame, it is read out in a second format (e.g. column-by-column) by the buffer controller and provided to a display driver that writes the data to the display. As the first frame is read out in the second format, the buffer controller receives image data for a second frame from the host system in the first format, but rotates it before writing it to the frame buffer such that it is written to the frame buffer in the second format. This rotation allows the buffer controller to write to the frame buffer and the display driver to read from the frame buffer concurrently, despite the different image data format requirements of the host system and display. When the second frame is completely written to the buffer in the second format, the buffer controller then reads the buffer in the first format, and writes it to the display. At this point the process repeats. Thus, the benefits of concurrent read and write are preserved.

19 Claims, 13 Drawing Sheets

(56) References Cited

U.S. PATENT DOCUMENTS

| | | |
|---|---|---|
| 6,574,033 B1 | 6/2003 | Chui et al. |
| 6,674,562 B1 | 1/2004 | Miles et al. |
| 6,961,065 B2 * | 11/2005 | Sasaki .......................... 345/582 |
| 7,042,643 B2 | 5/2006 | Miles |
| 7,123,216 B1 | 10/2006 | Miles |
| 7,284,113 B2 * | 10/2007 | Prokopenko et al. ............. 712/7 |
| 7,327,510 B2 | 2/2008 | Cummings et al. |
| 7,327,873 B2 | 2/2008 | Reese |
| 7,511,722 B1 | 3/2009 | Ollmann |
| 7,560,299 B2 | 7/2009 | Cummings |
| 7,576,758 B2 | 8/2009 | Kothandaraman et al. |
| 7,889,163 B2 | 2/2011 | Chui et al. |
| 7,990,604 B2 | 8/2011 | Lee et al. |
| 2002/0024711 A1 | 2/2002 | Miles |
| 2004/0026757 A1 | 2/2004 | Crane, Jr. et al. |
| 2005/0122560 A1 | 6/2005 | Sampsell et al. |
| 2005/0184993 A1 | 8/2005 | Ludwin et al. |
| 2006/0158554 A1 * | 7/2006 | Cho .............................. 348/537 |
| 2007/0139445 A1 | 6/2007 | Khan et al. |
| 2008/0111958 A1 * | 5/2008 | Kleverman et al. .......... 349/114 |
| 2008/0204464 A1 | 8/2008 | Roh |
| 2010/0245313 A1 | 9/2010 | Lewis et al. |

FOREIGN PATENT DOCUMENTS

| | | |
|---|---|---|
| WO | WO 2004/026757 | 4/2004 |
| WO | WO 2005/083672 A2 | 9/2005 |
| WO | WO 2006/113905 A2 | 10/2006 |

OTHER PUBLICATIONS

PCT, International Search Report and Written Opinion, for PCT/US2011/027434, dated Apr. 20, 2011.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

SYSTEM AND METHOD FOR FRAME BUFFER STORAGE AND RETRIEVAL IN ALTERNATING ORIENTATIONS

BACKGROUND

1. Field of the Invention

This invention is related to methods and devices for driving displays.

2. Description of the Related Art

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

Briefly and in general terms, the present invention provides a method and apparatus whereby concurrent read and write operations from and to a display-sized frame buffer are accomplished where a host system provides image data in a first format for a display that requires the data to be written to it in a second format.

One embodiment is A method for processing image data for display, including for each incoming image frame, successively alternating between storing rows of the incoming image frame as rows in the frame buffer and storing rows of the incoming image frame as columns in the frame buffer while successively alternating between displaying rows of a frame buffer as columns on a display and displaying columns of the frame buffer as columns on the display.

Another embodiment is a method for processing image data for display, including: (a) storing a first image frame in a frame buffer; (b) reading a first column of the frame buffer for display as a column; (c) rotating a first row of a second image frame and storing the rotated data in the first column of the frame buffer; (d) reading a second column of the frame buffer for display as a column; (e) rotating a second row of the second image frame and storing the rotated data in the second column of the frame buffer; (f) repeating steps (b) through (e) until the first image frame has been read from the frame buffer and the second image frame has been stored in the frame buffer (g) reading a first row of the frame buffer and rotating it for display as a column; (h) storing a first row of a third image frame in the first row of the frame buffer; (i) reading a second row of the frame buffer and rotating it for display as a column; (j) storing a second row of a third image frame in the second row of the frame buffer; (k) repeating steps (g) through (j) until the second image frame has been read from the frame buffer and the third image frame has been stored in the frame buffer; and (l) repeating steps (b) through (k) continuously.

Yet another embodiment is A method for processing image data for a display, including: obtaining image data from a host system in a first format; successively alternating between storing the image data in a frame buffer in the first format and a second format; successively alternating between reading the image data from the frame buffer in the first format and the second format; and displaying the image data in the second format.

A further embodiment is a display system including a display, a frame buffer, and logic circuitry configured to: obtain image data from a host system in a first format; successively alternate between storing the image data in a frame buffer in the first format and a second format; successively alternate between reading the image data from the frame buffer in the first format and the second format; and provide the image data for display in the second format.

An additional embodiment is a display system including means for storing image data; means for obtaining image data from a host system in a first format; means for successively alternating between storing the image data in the storage means in the first format and a second format; means for successively alternating between reading the image data from the frame buffer in the first format and the second format; and means for displaying the image data in the second format.

DETAILED DESCRIPTION OF THE PREFERRED EMBODIMENTS

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One embodiment is a method of rotating image data for successive frames stored in a frame buffer so that a host system provides image data to a buffer in one format, and a display receives data from the buffer in a different format while retaining the benefits of concurrent write and read operations from that buffer. Using this method a buffer controller starts by receiving image data from a host system in a first format (e.g. row-by-row) and writes it to the frame buffer in the first format. When the buffer is completely filled with the first frame, it is read out in a second format (e.g. column-by-column) by the buffer controller and provided to a display driver that writes the data to the display. As the first frame is read out in the second format, the buffer controller receives image data for a second frame from the host system in the first format, but rotates it before writing it to the frame buffer such that it is written to the frame buffer in the second format. This rotation allows the buffer controller to write to the frame buffer and the display driver to read from the frame buffer concurrently, despite the different image data format requirements of the host system and display. When the second frame is completely written to the buffer in the second format, the buffer controller then reads the buffer in the first format, and writes it to the display. At this point the process repeats. Thus, the benefits of concurrent read and write are preserved.

Figure 1:
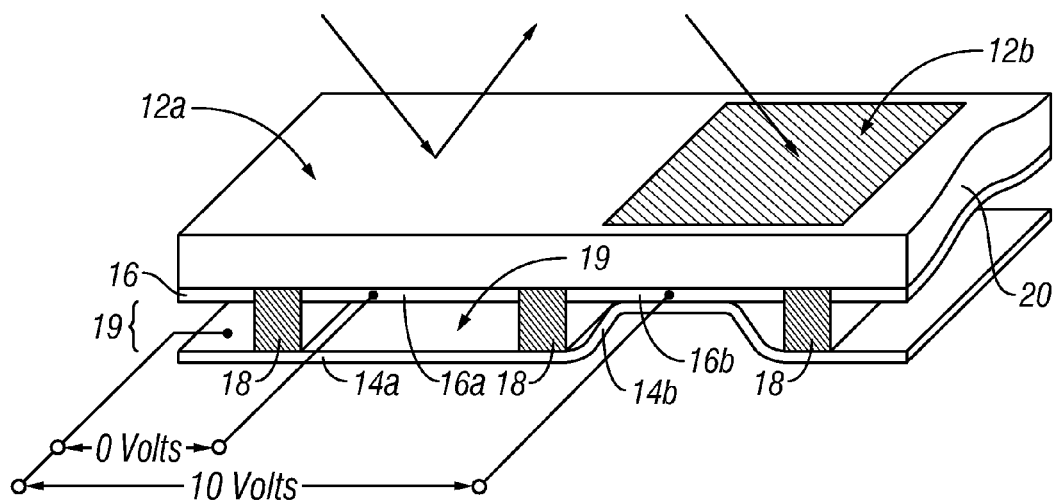
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
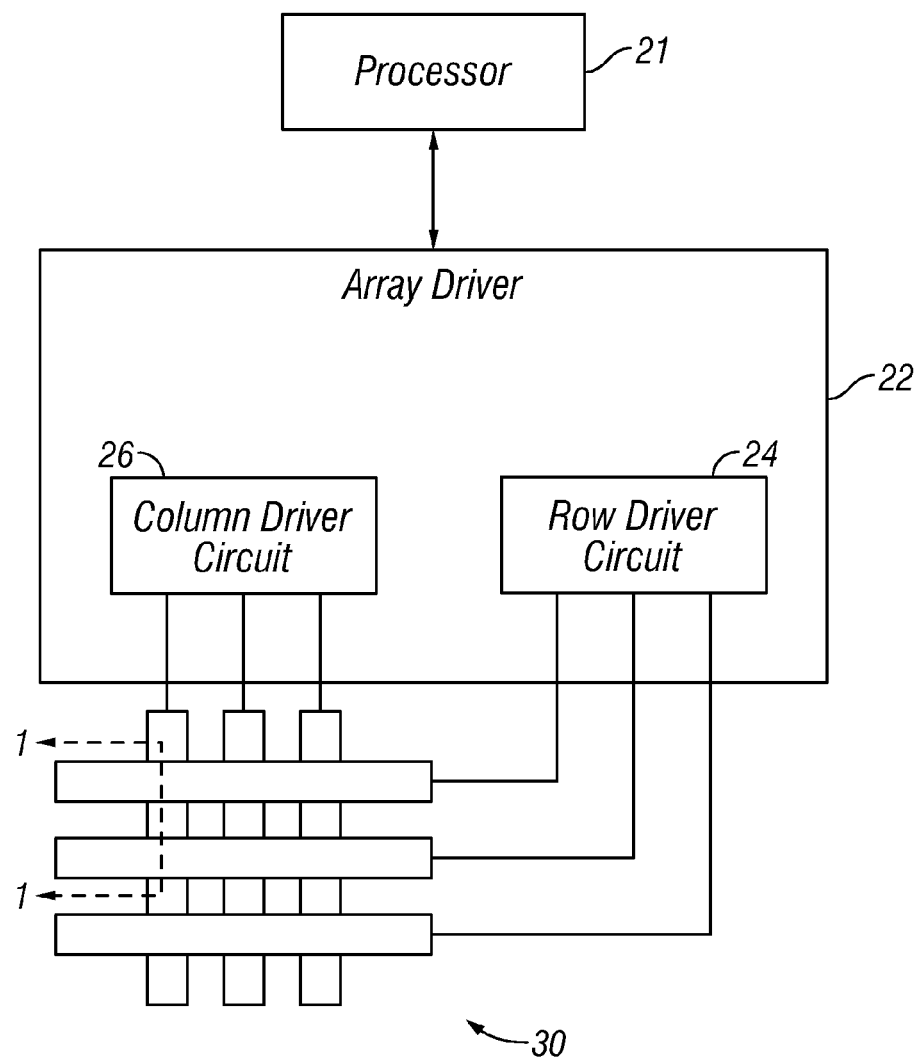
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
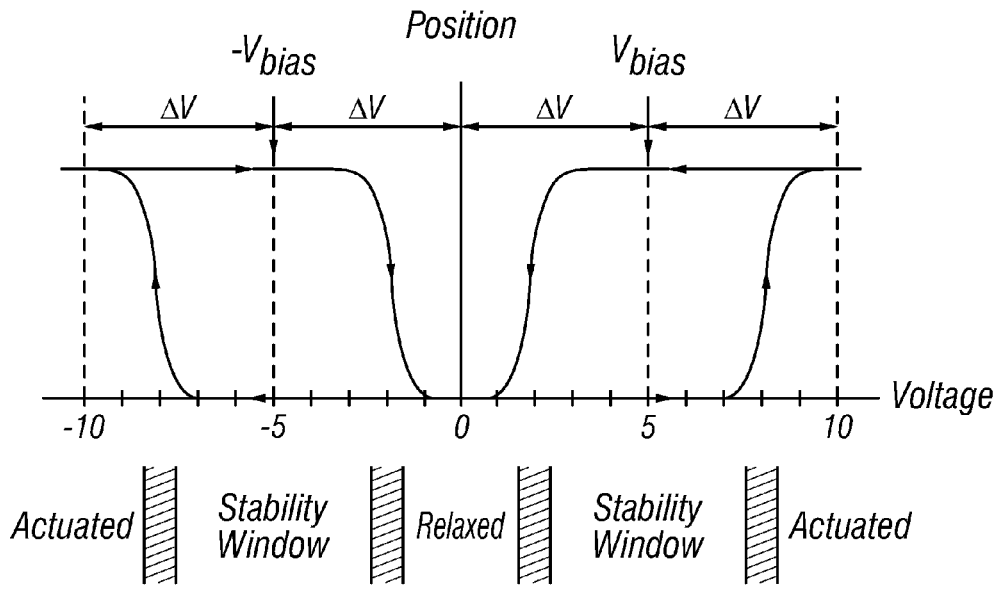
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
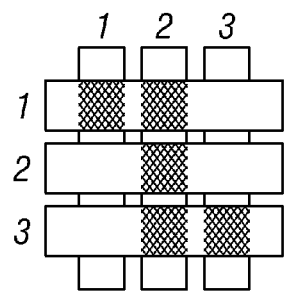
FIGS. 5A and 5B illustrate one exemplary timing diagram for row and column signals that may be used to write a frame of display data to the 3×3 interferometric modulator display of FIG. 2.
Figure 5B:
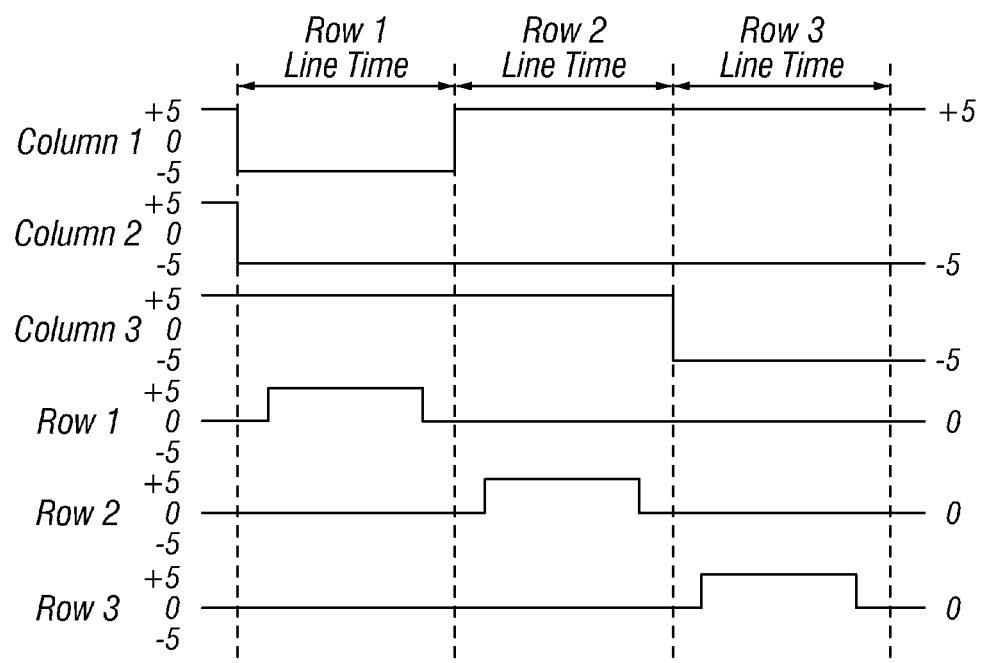

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
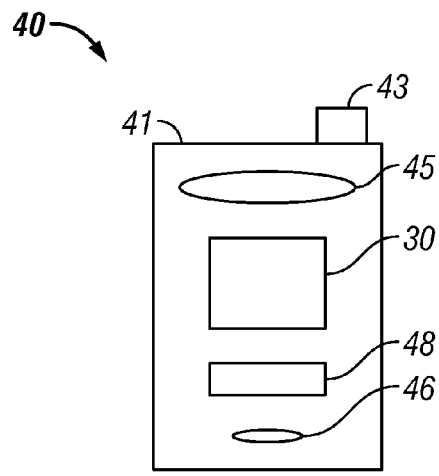
FIGS. 6A and 6B are system block diagrams illustrating an embodiment of a visual display device comprising a plurality of interferometric modulators.
Figure 6B:
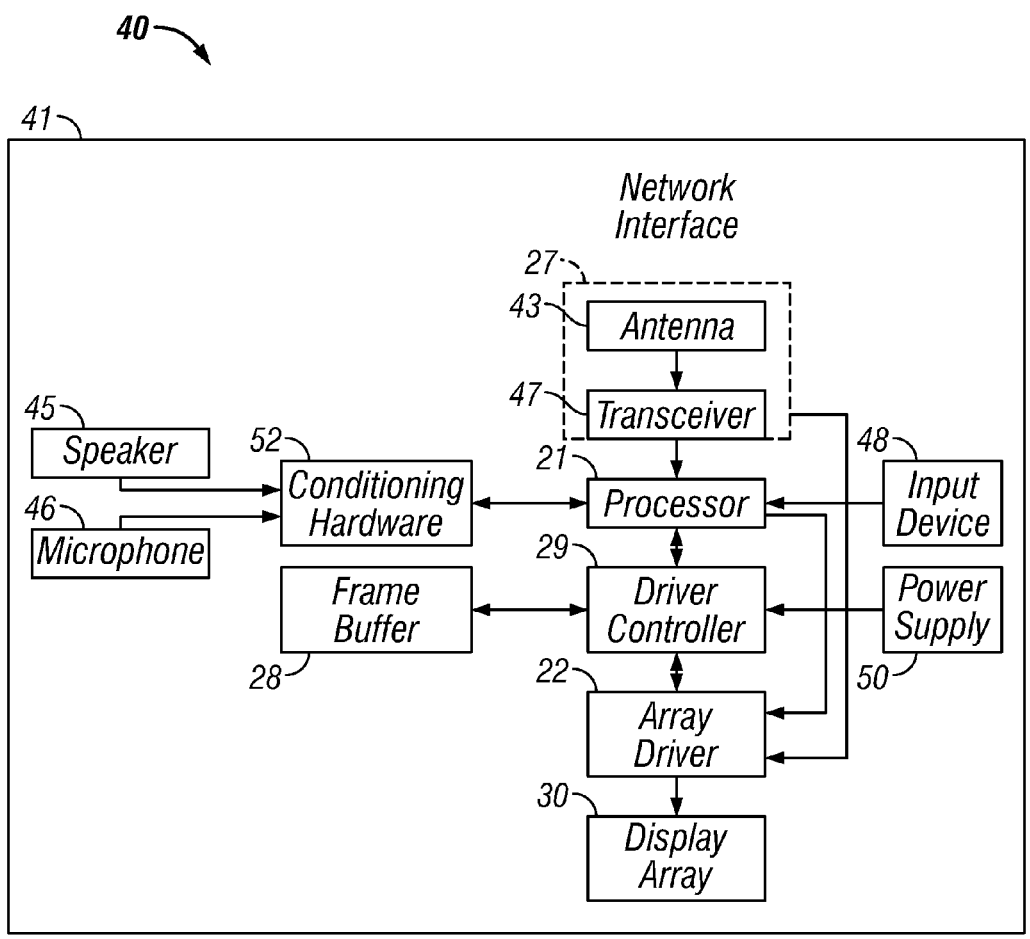

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
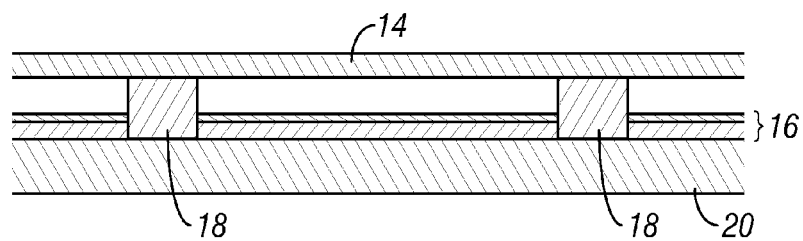
FIG. 7A is a cross section of the device of FIG. 1.
Figure 7B:
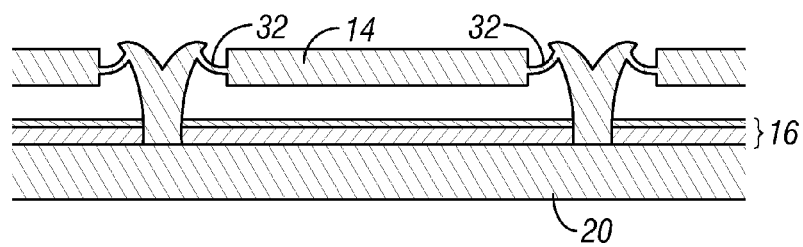
FIG. 7B is a cross section of an alternative embodiment of an interferometric modulator.
Figure 7C:
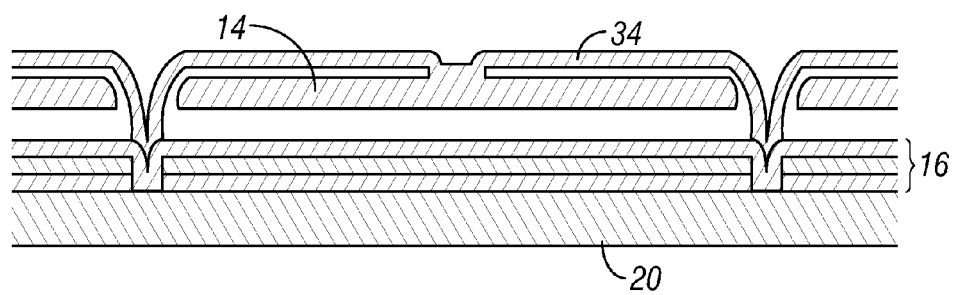
FIG. 7C is a cross section of another alternative embodiment of an interferometric modulator.
Figure 7D:
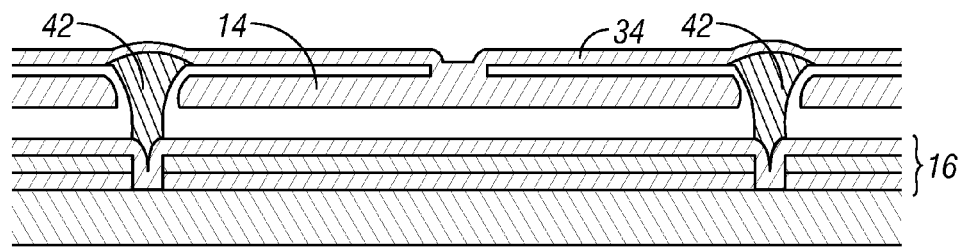
FIG. 7D is a cross section of yet another alternative embodiment of an interferometric modulator.
Figure 7E:
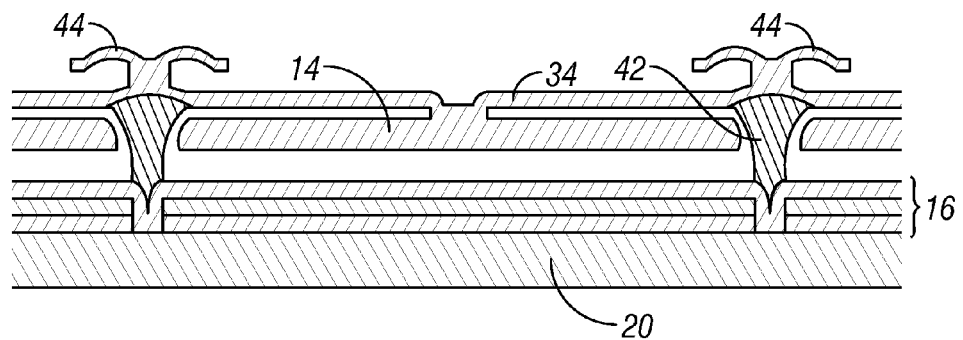
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
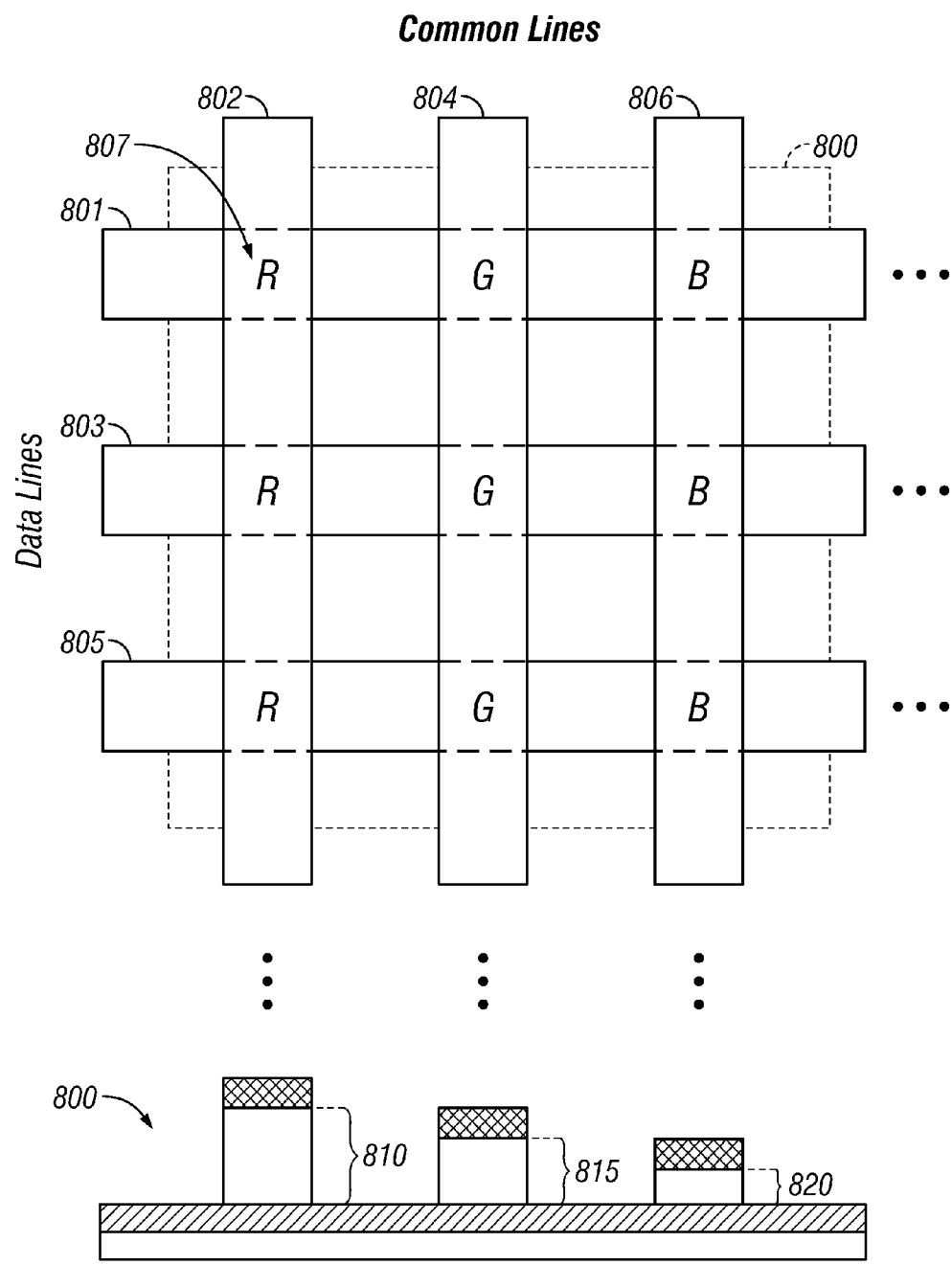
FIG. 8 is a plan and section view of a display region comprising three common lines and three data lines.

FIG. 8 shows a display region 800 comprising three common lines 802, 804 and 806, and three data lines 801, 803 and 805. Where the common lines and data lines intersect are formed display elements, e.g. 807, such as the interferometric modulators described above. To form a color display, modulators are provided with different optical gaps because different colors are reflected by optical gaps of different height. As shown—for example purposes only—the red display elements formed along common line 802 are characterize by a first gap distance 810, while the green display elements formed along common line 804 are characterized by a second gap distance of 815 and the blue display elements formed along common line 806 are characterized by a third gap distance 820. Such display arrays are often preferably constructed such that the common lines of like colors are in columns. Thus, image data for such an array is preferably written to the display in a column-by-column format.

Figure 9:
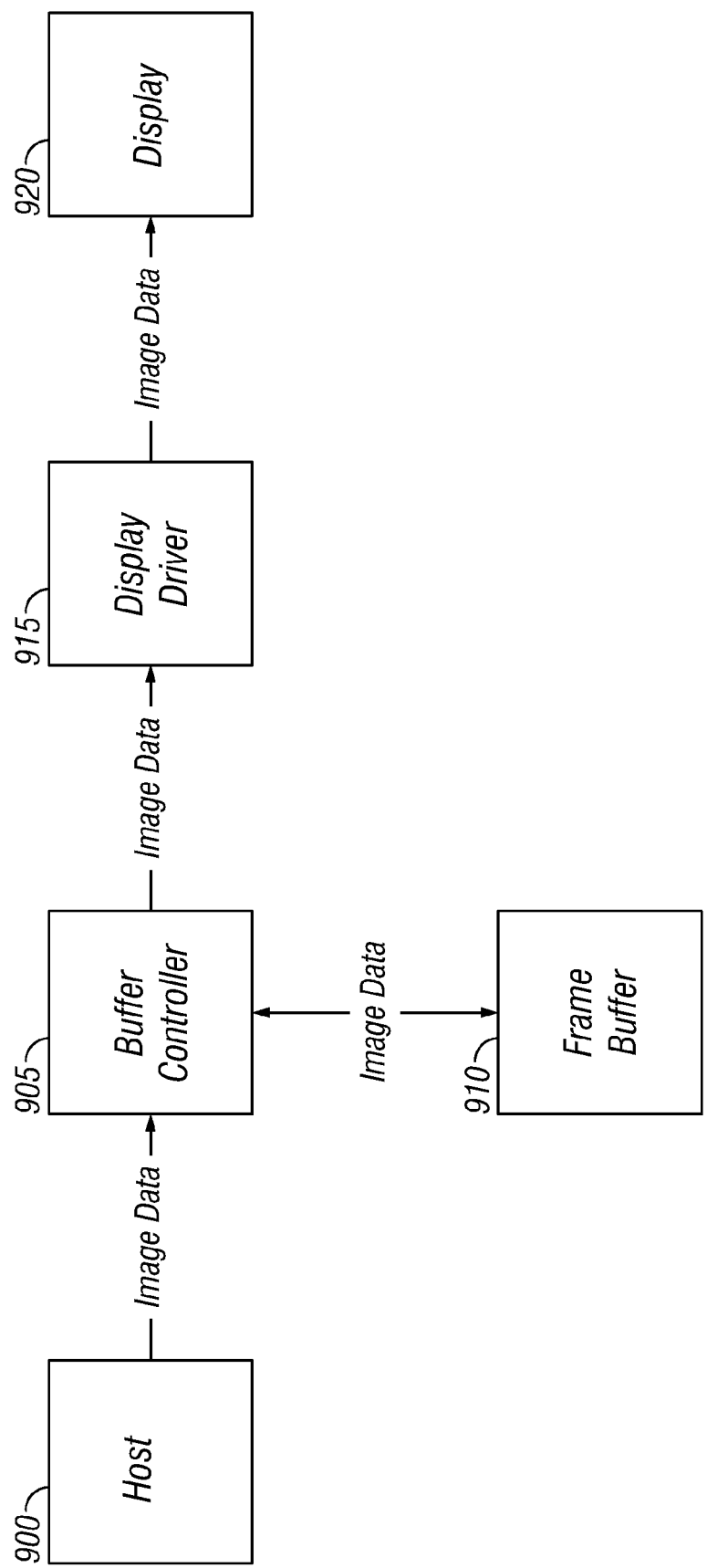
FIG. 9 is a functional view of a data display system showing a buffer controller.

FIG. 9 is a functional view of a data display system utilizing a buffer controller. As shown in FIG. 9, an exemplary display system comprises a host 900 which provides image data for display. The image data can be provided by the host 900 in a plurality of formats including, for example, row-by-row format and column-by-column format. Examples of hosts include personal computers, cell phones, GPS devices and other electronic devices meant to display image data. The display system also includes a buffer controller 905, which obtains image data from a host system and controls the reading and writing of host image data from and to the frame buffer 910. The buffer controller 905, as will be explained further below, can reorient image data into different formats (such as from row to column format, or vice versa) for storage in the frame buffer 910 or when providing the image data to the display driver 915. A buffer controller can be formed by logic circuitry, a dedicated processor, or software configured to control a general purpose processor to accomplish its function. The display system also includes a frame buffer 910 which stores image data. The frame buffer is comprised of memory, such as Random Access Memory (RAM), which preferably can store at least one complete frame of data. For binary pixels as described above, the information in the frame buffer my include a bit for every display element on the screen. Typically the frame buffer is stored in the memory chips on a video adapter, but in some instances the frame buffer is stored in general main memory. The display system also includes a display driver 915, which receives image data and writes it to the display 920. The display 920 may require image data to be provided in a particular format, such as, for example, row-by-row format or column-by-column format. The display system shown in FIG. 9 is exemplary only, and the structures shown are not exclusive of elements found in display systems. This figure only focuses on the parts of a display system which will be frequently discussed throughout this specification. The embodiment shown in FIG. 9 and explained throughout should not be considered limiting to the methods or apparatuses described herein. For example, the buffer controller 905 and display driver 915, while represented as separate in FIG. 9, could be combined functions of one set of logic circuitry, or one program designed to run on a single processor, etc. Those skilled in the art will appreciate that this functional representation is intended to ease the description of the embodiments described herein.

Figure 10:
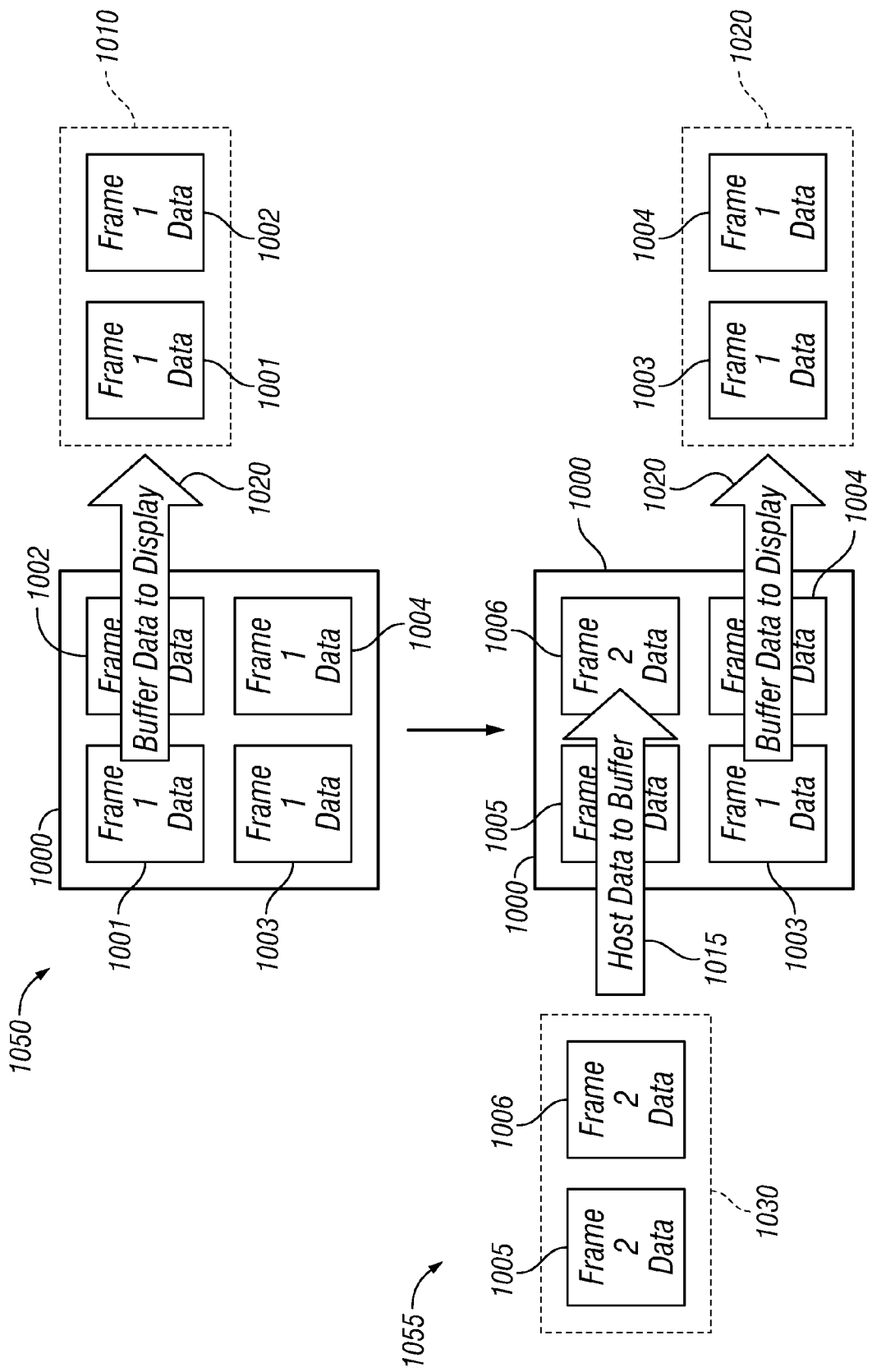
FIG. 10 is a representation of a concurrent read and write process to a frame buffer.

FIG. 10 shows a concurrent read and write process utilizing a frame buffer and read and write pointers. In display systems, it is common to control the flow of image data to and from a frame buffer by implementing read and write pointers that are prevented from "crossing" i.e. allowing the read pointer to get ahead of the write pointer. If the read pointer gets ahead of the write pointer, then it attempts to read image data which has not yet been written to the frame buffer. By preventing the pointers from crossing, corruption of the displayed image is prevented. For the purposes of this figure, the frame buffer 1000 comprises four memory locations configured to store four image data elements 1001-1004. Further, the frame buffer 1000 is used to buffer image data for a display comprising four display elements (not shown). Thus, the frame buffer and the display can be said to be the same "size" i.e. each memory location in the frame buffer holds image data for one display element. Also, in FIG. 10, a host system (not shown) provides image data to the buffer in a row-by-row format and the display associated with that buffer (not shown) has data written to it in the same row-by-row format.

The frame buffer 1000 is shown initially filled with 4 image data elements 1001-1004. The image data elements 1001-1004 collectively comprise a single image frame for a display. The arrow 1020 shows the data movement from the frame buffer to the display. At time 1050, a display driver (not shown) reads the first row of image data 1010, comprising image data elements 1001 and 1002, from the frame buffer 1000 and writes them to the first row of the display. At this point the memory locations for image data elements 1001 and 1002 can have new image data written to them. Thereafter, at time 1055, a buffer controller (not shown) receives image data for a first row of a second frame 1030, comprising image data elements 1005 and 1006, and writes it to the frame buffer 1000. Here again, the arrow 1015 indicates the direction of the data movement from the host system into the frame buffer. After writing row 1030 to the frame buffer, the display driver reads the second row of image data 1020, comprising image data elements 1003 and 1004, from the frame buffer 1000 and writes them to the second row of the display. Accordingly, by overlapping the writing of image data to the frame buffer 1000 with the reading out of the frame buffer 1000, a higher frame rate may be achieved for a given memory read/write bandwidth.

Figure 11:
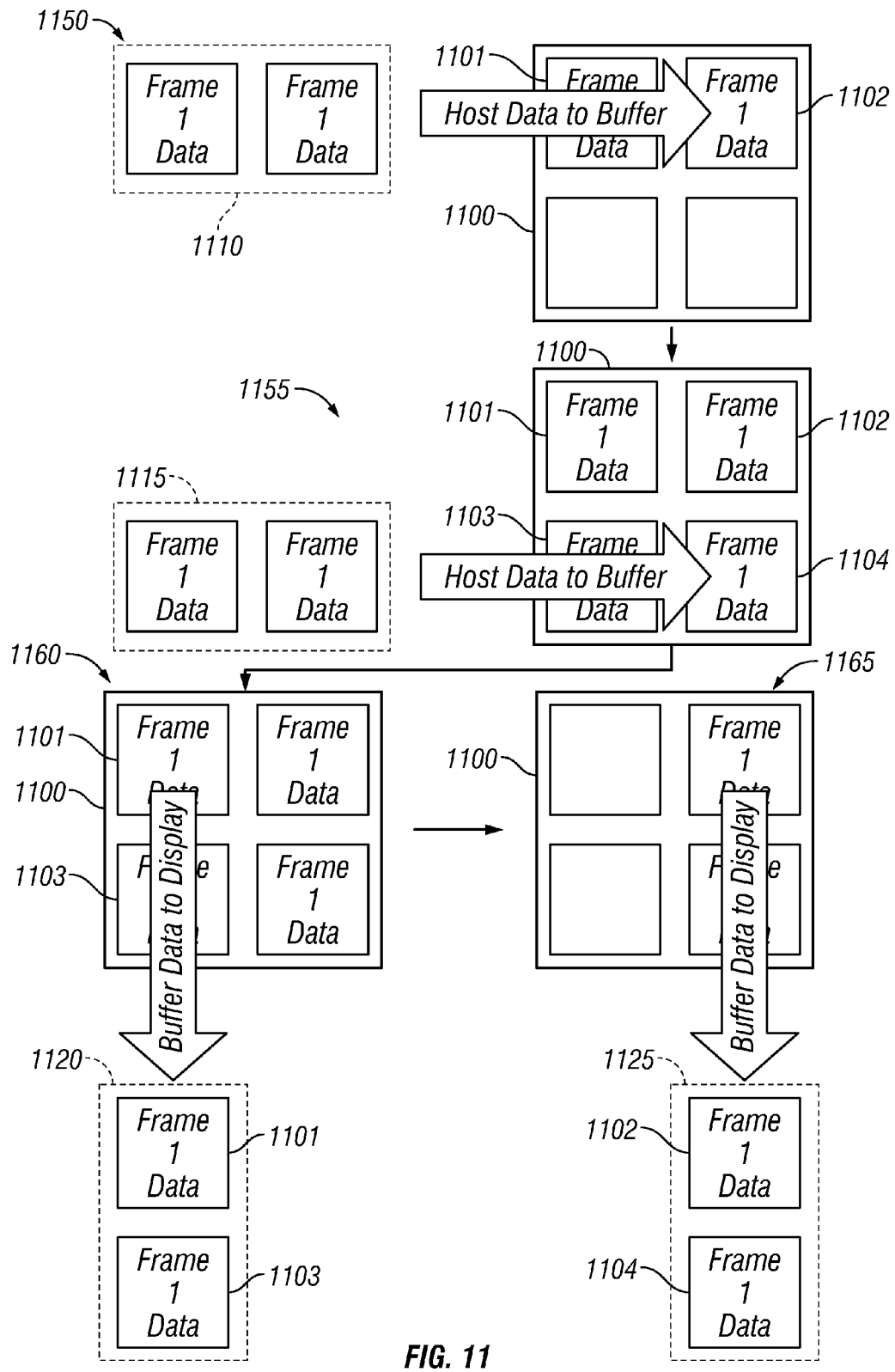
FIG. 11 is a representation showing a successive read and write process to a frame buffer.

FIG. 11 shows a situation in which a host system (not shown) provides image data to a buffer controller (not shown) in a first format, here row-by-row, but a display (not shown) requires that image data be written to it in a second format, here column-by-column. As with FIG. 10, the frame buffer 1100 comprises memory locations for four image data elements and is used to buffer image data for a display comprising four display elements. Thus, the frame buffer and display are the same size. At time 1150, the host system provides a first row of image data for a first frame 1110, comprising image data elements 1101 and 1102, to a buffer controller which writes it to the frame buffer 1100. Next, at time 1155, the host system provides a second row of image data for the first frame 1115, comprising image data elements 1103 and 1104, to the buffer controller which writes it to the frame buffer 1100. At time 1160, when the frame buffer is completely filled with a first frame of image data, the display driver is then able to read a first column of image data of the first frame 1120, comprising image data elements 1101 and 1103, from the frame buffer 1100 and write it to the display. At time 1165, the display driver reads the second column of image data for the first frame 1125, comprising image data elements 1102 and 1104, from the frame buffer and writes it to the display. As is shown in FIG. 11, when the frame buffer and display are the same size and the host system provides image data in a different format than the display needs to be written to (here row-by-row versus column-by-column), there is an inability to concurrently write to and read from the frame buffer. That is, any successive frame of image data cannot begin to be written to the frame buffer until the former frame has been completely written to the display. Concurrent read and write operations are not possible because the image data on the display would be incorrect. This problem can be solved with the embodiment of the invention shown in FIG. 12.

Figure 12:
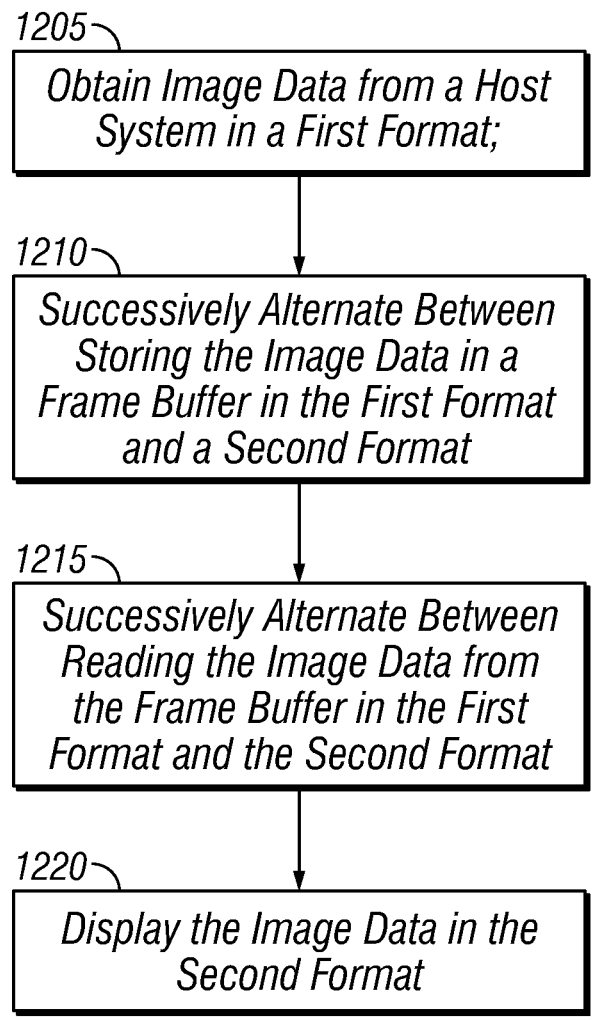
FIG. 12 is a flowchart of one embodiment of a method described herein.

FIG. 12 shows a flow chart of one embodiment of a method for utilizing a display-sized frame buffer where the host system provides image data in a first format for a display that requires the data to be written to it in a second format. The first step of the method, shown at 1205, is to obtain image data from a host system in a first format, such as, for example, row-by-row or column-by-column. The next step, shown at 1210, is to store the received image data in a frame buffer alternately in a first format and then a second format for successive frames. For example, if the first frame is received and stored in the frame buffer in a row-by-row format, then the second frame would be stored in the same frame buffer in a column-by-column format, and then the third successive frame would be stored in a row-by-row format and so on. The next step, shown at 1215, is to alternate between reading the image data from the frame buffer in the first format and the second format. For example, for successive frames the image data may be read from columns of the frame buffer, and then as rows, and then as columns and so on. The final step, shown at 1220, is to display the image data stored in the frame buffer on a display in a second format. For example, if the image data received in the first step 1205 is stored in the frame buffer in a row-by-row format at 1210, it may then be read out of the frame buffer as columns at step 1215 and displayed as columns at step 1220. Alternatively, if the image data received in the first step 1205 is stored in the frame buffer in a column-by-column format at 1210, it may then be read out of the frame buffer as columns at step 1215 and displayed as columns at step 1220. Notably, writing to the frame buffer and reading from it can be completed concurrently despite the different formats of the image data.

Figure 13:
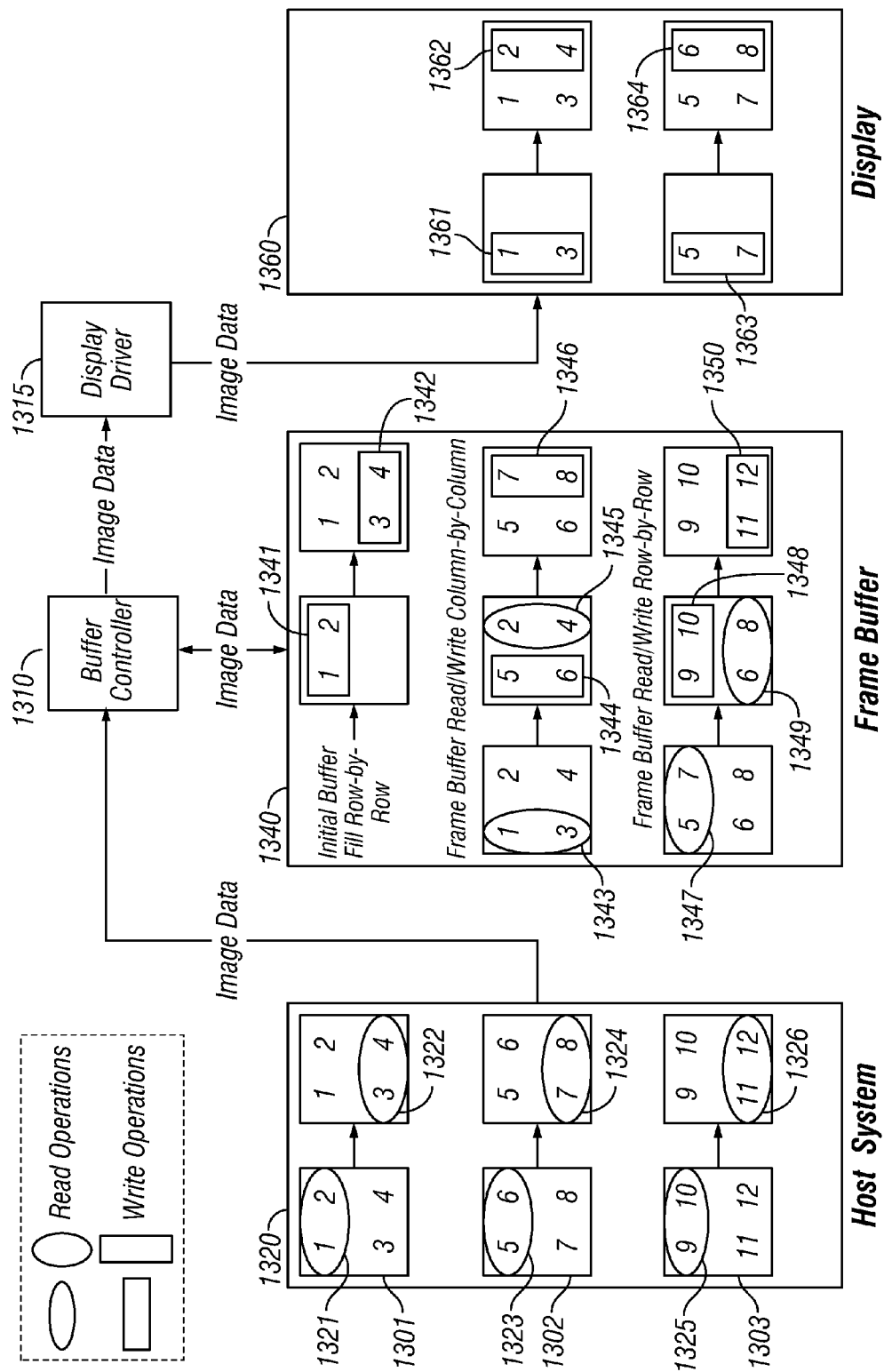
FIG. 13 is a flowchart of one embodiment of a method for utilizing a display-sized frame buffer where the host data is provided to the frame buffer in a different format than that required by the display.

FIG. 13 shows an embodiment of the method of FIG. 12 where the host system provides image data in a first format for a display that requires the data to be written to it in a second format. The host system 1320 is represented by the leftmost box. Within the host system 1320 are shown three image frames 1301-1303 being transferred for display. Each image frame 1301-1303 is made up of four image data elements; here image frame 1301 is made up of image data elements 1-4, image frame 1302 is made up of image data elements 5-8, and image frame 1303 is made up of image data elements 9-12. These image frames 1301-1303 are meant to be displayed successively on a display; that is: image frame 1301 is displayed first, then image frame 1302 is displayed, and then image frame 1303 is displayed. The buffer controller 1310 controls the flow of image data between the host system 1320 and the frame buffer 1340, and between the frame buffer 1340 and the display driver 1315. In this embodiment, the buffer controller implements read and write pointers as it controls the image data flowing to and from the frame buffer. Within the frame buffer 1340 are shown various states of its memory locations at different times during the read/write cycles. Here, the frame buffer 1340 has memory allocated for four image data elements. The display driver 1315 receives image data from the buffer controller and creates the proper waveforms for writing the image to the display 1360. Finally, on the right is shown various states of a display 1360 with four display elements. The display 1360 requires that image data be written to it in column format. In this embodiment, the display 1360 has the same number of display elements as the frame buffer 1340 has memory locations for image data elements. Thus, the frame buffer 1340 and the display 1360 are the same size. The frame buffer's 1340 memory arrangement, allocation, etc is not dictated by this figure; but is used for simplicity in explaining the method. Further, it is understood that memory allocations in a frame buffer 1340 need not take on the geometric representation in FIG. 13 (often data is stored serially in memory). Those skilled in the art will appreciate that this representation is utilized to concisely explain the method.

First, the host system 1320 provides a first row 1321 of a first frame 1301 to the buffer controller 1310, which writes it to the frame buffer 1340 at 1341. In this embodiment, during the initial buffer-fill stage, there is no writing to the display because the display requires columns of image data and a complete column of image data is not available until all rows of a first frame have been written to the frame buffer. In a next step, the host system provides a second row 1322 to the buffer controller 1310, which writes it to the frame buffer 1340 at 1342. At this point, the image data from the first frame 1301 has been completely written to the frame buffer 1340.

Next, the buffer controller 1310 reads a first column of image data 1343 from the frame buffer 1340 and provides it to the display driver 1315. Thereafter, the display driver writes the first column of image data 1343 to the display 1360 at 1361. After the first column of image data 1343 is written to the display, the memory locations for the first column of the frame buffer 1340 are free to receive new image data. The buffer controller then receives a first row 1323 of a second frame 1302 from the host system 1320 and writes it to the frame buffer 1340 as a column at 1344. Notably, the row of data 1323 has been rotated into a column format at 1344. Thereafter, the buffer controller 1310 provides to the display driver 1315 a second column of the first frame 1345 and the display driver 1315 then writes the second column of image data 1345 to the display at 1362. Thus, the first frame 1301 is now completely written to the display 1360. After the column 1345 is written to the display 1360, the second column of memory locations in the frame buffer 1340 is ready to be written to. At this point, the buffer controller 1310 receives from the host system 1320 a second row of image data 1324 from the second frame 1302 and writes it to the frame buffer 1340 as a column at 1346. Thus, the frame buffer 1340 is now completely filled with a second frame of image data 1302, wherein the image data are rotated from row orientation to column orientation for storage.

In the next step of the method, the display 1360 is ready for the second frame of display data 1302. Currently, the rows of image data for the second frame (1323 and 1324) are stored as columns in the frame buffer at 1344 and 1346. Thus, the buffer controller 1310 reads the first row of the frame buffer at 1347, which corresponds to the first column of the second frame, and provides it to the display driver 1315 as a column. Then, the display driver 1360 writes a properly reoriented first column of image data for the second frame 1302 to the display 1360 at 1363. The first row of the frame buffer 1340 is again ready to be written to. Next the buffer controller 1310 receives a first row 1325 of a third frame of image data 1303 from the host system 1320. The buffer controller 1310 then writes the first row of frame data 1325 for the third frame 1303 to the frame buffer as a row at 1348. Next, the buffer controller 1310 reads the second row of the frame buffer 1340 at 1349, which corresponds to the second column of the second frame, and provides it to the display driver 1315 as a column. The display driver 1315 then writes the reoriented image data to the display as a column at 1364. Thus, the display 1360 is now showing the full second frame of image data. When the second row of the frame buffer 1349 is written to display, the memory locations associated with the second row of the frame buffer 1340 are ready to be written to. Then the buffer controller 1310 receives from the host system 1320 a second row of frame data 1326 for the third frame 1303 and writes it to the frame buffer 1340 at 1350.

At this point, the frame buffer contains the image data for the third frame 1303 oriented in the original row-by-row format, and thus the method repeats—restarting as it did at 1343 with a properly oriented set of frame data ready to be read from the frame buffer 1340 and written to the display 1360.

Although the present invention has been described in detail, it should be understood that various changes, substitutions, and alterations can be made hereto without departing from the spirit and scope of the invention as defined by the following claims.

What is claimed is:

1. A method for processing image data for display, comprising:
for each incoming image frame, successively alternating between storing rows of the incoming image frame as rows in a frame buffer and storing rows of the incoming image frame as columns in the frame buffer while successively alternating between displaying rows of the frame buffer as columns on a display and displaying columns of the frame buffer as columns on the display.

2. The method of claim 1, wherein the frame buffer is the same size as the display.

3. The method of claim 1, wherein the display comprises electromechanical devices.

4. The method of claim 3, wherein the electromechanical devices are IMODs.

5. A method for processing image data for display, comprising:
(a) storing a first image frame in a frame buffer;
(b) reading a first column of the frame buffer for display as a column;
(c) rotating a first row of a second image frame and storing the rotated data in the first column of the frame buffer;
(d) reading a second column of the frame buffer for display as a column;
(e) rotating a second row of the second image frame and storing the rotated data in the second column of the frame buffer;

(f) repeating steps (b) through (e) until the first image frame has been read from the frame buffer and the second image frame has been stored in the frame buffer;
(g) reading a first row of the frame buffer and rotating it for display as a column;
(h) storing a first row of a third image frame in the first row of the frame buffer;
(i) reading a second row of the frame buffer and rotating it for display as a column;
(j) storing a second row of a third image frame in the second row of the frame buffer;
(k) repeating steps (g) through (j) until the second image frame has been read from the frame buffer and the third image frame has been stored in the frame buffer; and
(l) repeating steps (b) through (k) continuously.

6. A method for processing image data for a display, comprising:
obtaining image data from a host system in a first format;
successively alternating between storing the image data in a frame buffer in the first format and a second format;
successively alternating between reading the image data from the frame buffer in the first format and the second format; and
displaying the image data in the second format;
wherein one of the first format and the second format is row-by-row, and wherein the other of the first format and the second format is column-by-column.

7. The method of claim 6, wherein the frame buffer is the same size as the display.

8. The method of claim 6, wherein image data from a second frame is stored in the frame buffer concurrent with the reading of image data from a first frame in the same frame buffer.

9. The method of claim 6, wherein a read pointer reads the image data from the frame buffer and a write pointer writes the image data to the frame buffer.

10. The method of claim 9, wherein the write pointer always writes an element of image data for a particular frame before the read pointer reads that element of image data.

11. A display system comprising:
a display;
a frame buffer, and
logic circuitry configured to:
obtaining image data from a host system in a first format;
successively alternating between storing the image data in the frame buffer in the first format and a second format;
successively alternating between reading the image data from the frame buffer in the first format and the second format; and
provide the image data for display in the second format;
wherein one of the first format and the second format is row-by-row, and wherein the other of the first format and the second format is column-by-column.

12. The display system of claim 11, wherein the frame buffer is the same size as the display.

13. The display system of claim 11, wherein image data from a second frame is stored in the frame buffer concurrent with the reading of image data from a first frame in the same frame buffer.

14. The display system of claim 11, further configured to use a read pointer and a write pointer, wherein the read pointer reads the image data from the frame buffer and the write pointer writes the image data to the frame buffer.

15. The display system of claim 14, wherein the write pointer always writes an element of image data for a particular frame before the read pointer reads that element of image data.

16. The display system of claim 11, wherein the image data are displayed by an electromechanical device.

17. The display system of claim 16, wherein the electromechanical device is an IMOD.

18. A display system comprising:
means for storing image data;
means for obtaining image data from a host system in a first format;
means for successively alternating between storing the image data in the storage means in the first format and a second format;
means for successively alternating between reading the image data from a frame buffer in the first format and the second format; and
means for displaying the image data in the second format;
wherein one of the first format and the second format is row-by-row, and wherein the other of the first format and the second format is column-by-column.

19. The display system of claim 18, wherein image data from a second frame is stored in the storage means concurrent with the reading of image data from a first frame in the same storage means.

* * * * *